United States Patent [19]
Krajec

[11] Patent Number: 5,996,960
[45] Date of Patent: Dec. 7, 1999

[54] VIBRATION ISOLATION PLATFORM

[75] Inventor: Russell Steven Krajec, Berthoud, Colo.

[73] Assignee: Hewlett-Packard Company, Palo Alto, Calif.

[21] Appl. No.: 09/074,869

[22] Filed: May 8, 1998

[51] Int. Cl.⁶ ..................................................... F16M 1/00
[52] U.S. Cl. .......................................... 248/638; 248/678
[58] Field of Search .................................... 248/638, 637, 248/664, 676, 678

[56] References Cited

U.S. PATENT DOCUMENTS

| | | | |
|---|---|---|---|
| 4,871,142 | 10/1989 | DeMey, II | 248/638 X |
| 5,456,047 | 10/1995 | Forka | 248/638 X |
| 5,765,800 | 6/1998 | Watabe et al. | 248/638 X |
| 5,876,012 | 3/1999 | Haga et al. | 248/638 X |

*Primary Examiner*—Ramon O. Ramirez

[57] ABSTRACT

The inventive vibration isolation platform is connected between a fixture which supports a device to be tested, and an automatic testing machine. The platform has two positions. In the first position, the fixture is ridgedly locked in a predetermined location for loading and unloading of the device. In the second position, the fixture is in a testing position, wherein the fixture is vibrationally isolated from the testing machine. Therefore, during loading and unloading, the location of the fixture is precisely known to the automatic testing machine. During testing, the fixture is isolated from the automatic testing machine, and hence receives substantially no vibrational energy from the automatic testing machine. Thus, the device can be tested without interference from unwanted vibrations or sounds.

55 Claims, 2 Drawing Sheets

VIBRATION ISOLATION PLATFORM

TECHNICAL FIELD OF THE INVENTION

This application relates in general to automatic testing machines, and in specific to a vibration platform which isolates the fixture from the automatic testing machine.

BACKGROUND OF THE INVENTION

An automatic testing machine (ATM) operates in a production environment to rapidly and accurately test the operation and performance of various types of devices under test (DUT), including computer devices and communication devices. The DUTs could be a finished product or a component of a larger system.

The ATM is programmed to perform various tests on the DUT automatically. For example, a microcomputer chip DUT may be fed power and known input signals, and the output signal of the DUT is compared with expected results. Another example is where RF signals are transmitted to a finished cellular telephone DUT to determine if the telephone properly operates. Other tests could include environmental tests, such as temperature tests.

Depending upon the nature and number of the tests being performed, the testing may last from a couple of milliseconds to several minutes. The information from the testing is compared with expected test results. If there is some defect such that the DUT falls below specifications, the ATM will designate the DUT as failed, either by marking the DUT, placing the DUT in a failure area, or indicating the failure to an operator.

The ATM is then loaded with the next DUT, either manually or automatically, and the testing procedure is repeated for this next DUT. This testing information can be used to evaluate the fabrication process for possible changes, as well as to perform failure analysis on individual failed devices.

Typically, each ATM is designed to perform a specific class of tests on the DUT, and are not able to perform other classes of tests. For example, a temperature ATM may not be able to perform electrical signal tests. However, different types of DUTs may require the same tests to be performed. For example, all types of microcomputer chips are tested for electronic performance characteristics, but different chips will have different locations for power, inputs and outputs. ATMs are made flexible by the use of test fixtures. The test fixture provides an interface between the device under test DUT and the ATM. Thus, a single ATM can perform tests on different types of devices when connected via different fixtures.

The automatic testing machines generate a great deal of vibration. The sources of the vibration include the operation of robots to load and unload the DUTs, operation of the testing machines, manipulation of the DUTs during testing, and the tests themselves, i.e. sound tests. These vibrations are passed on to the DUT and can adversely effect the testing of the DUT. Some types of testing, particularly acoustic testing, are very sensitive to vibration energy or sound energy, especially low frequency energy. The testing of the DUT may be corrupted by the vibrations, which will cause incorrect information about DUT to be collected. The incorrect information could lead to improperly passing a defective DUT or failing a passing DUT. The incorrect information may also result in incorrect or unnecessary changes being made to the DUT production process.

One solution to this problem is to isolate the fixture from the automatic testing machine. A vibrational isolation mechanism is used to separate the fixture from the machine. A variety of such mechanisms are available, for example a pneumatic air table, a spring mechanism, or a foam or rubber isolation pad. Thus, the fixture is not ridgedly attached to the machine. Therefore vibration and/or sound energy from the testing machine, other equipment, or the floor would not be transmitted to the fixture. However, because the fixture is not ridgedly attached to the testing machine, the robots used to load and unload the machine, as well as actuators in the machine which secure the DUT and couple to the DUT, do not know the precise location of the fixture, and hence the DUT. Consequently, the testing machine must use an adaptive mechanism to locate the fixture, and properly place, remove or otherwise manipulate the DUT. The adaptive mechanism could be touch sensors mounted on the robot, or a vision system with an optical object recognition program. Mechanical limits are sometimes used to confine the fixture to a predefined region, i.e. pins or stops. Thus, the fixture can more easily be located by the robot. However, if the fixture touches the limit, then vibration and sound energy will be conducted through the limit and into the fixture. Moreover, the time spent locating the fixture and the DUT adversely affects production time. In other words, it costs production time for the testing machine to have locate the fixture.

Alternatively, the fixture can be ridgily attached to the testing machine. Since the fixture does not move with respect to the testing machine, then the testing machine will always know precisely where the fixture and the DUT are located. Thus additional mechanism such as touch sensors and vision camera are not needed. Moreover, no production time is lost in having the testing machine locate the fixture or device. However, the fixture will receive vibrational and/or sound energy from the testing machine. Thus, vibrations from robot motion, testing structures moving around, conveyor belts, other equipment operating, the floor, etc. will be conducted to the fixture. Thus, the vibrations and other sounds reaching the fixture can corrupt the testing of the DUT, particularly acoustic testing.

Therefore, there is a need in the art for a mechanism that will isolate the fixture from the automatic testing machine, while having the fixture be precisely located such that the testing machine does not require any adaptive mechanism to locate the fixture which would impact production time.

SUMMARY OF THE INVENTION

These and other objects, features and technical advantages are achieved by a system and method has the fixture rigidly locked in a predetermined location during loading and unloading, and moves the fixture to an isolation position during testing. Therefore, during loading and unloading, the location of the fixture is precisely known to the automatic testing machine. Thus, the machine does not spend any production time locating the fixture and DUT, and does not require any expensive adaptive mechanisms such as vision cameras to locate the fixture. During testing, the fixture is isolated from the automatic testing machine, and hence receives substantially no vibrational energy from the automatic testing machine. Thus, vibrations and other noises from the testing machine, other testing machines, other equipment, and the floor will not be conducted to the fixture and the DUT.

A technical advantage of the present invention is reduction of vibrational and sound energy being conducted to the fixture through an automatic testing machine.

Another technical advantage of the present invention is that the location of the fixture is precisely known by the automatic testing machine during loading and unloading operations.

A further technical advantage of the present invention is that the testing of devices can occur without interference from unwanted vibrations or sounds.

A further technical advantage of the present invention is that the production time is improved because the automatic testing machine does not have to spend production time locating the fixture.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
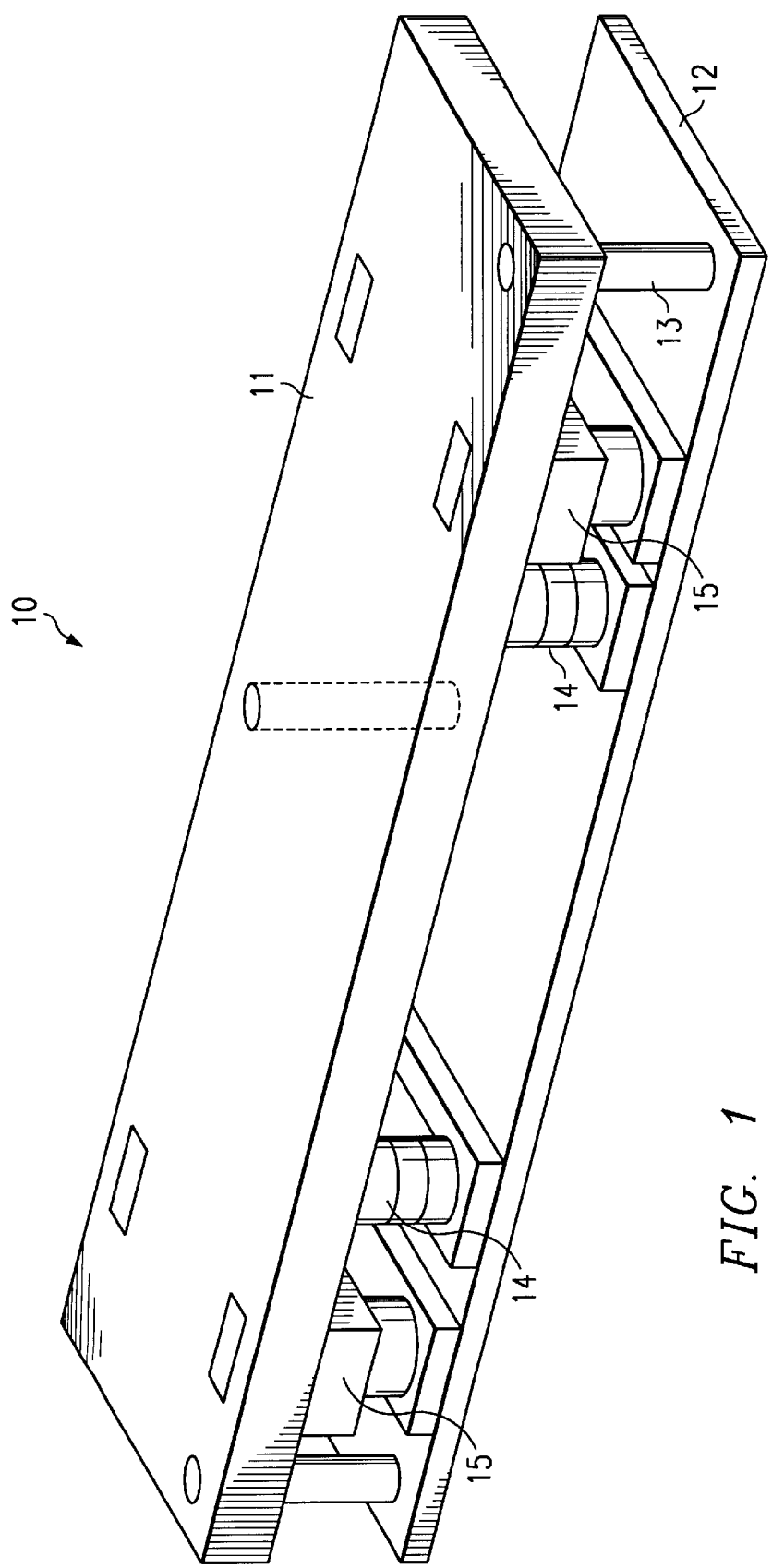
FIG. 1 depicts the inventive isolation platform to which the fixture is connected.
Figure 3A:
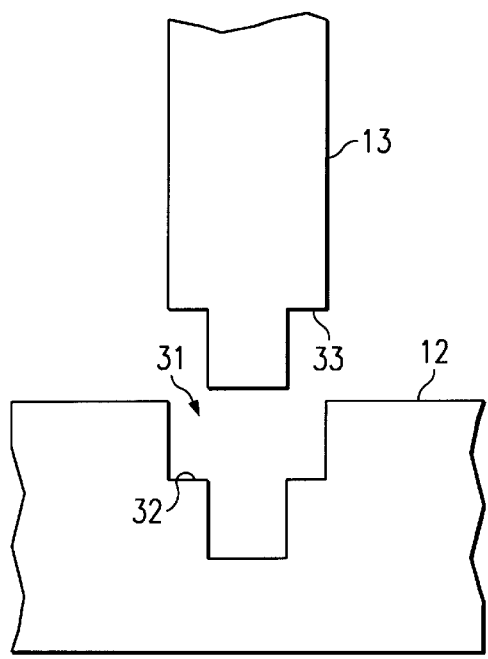
FIGS. 3A and 3B each depict an alignment pin and a corresponding bushing of the platform of FIG. 1.
Figure 3B:
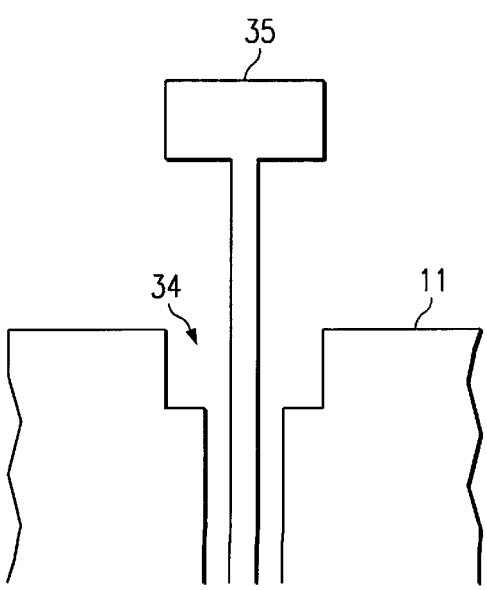

FIG. 1 depicts the inventive vibration isolation platform 10. Platform 10 comprises two plates, a moveable upper plate 11 and a fixed lower plate 12. The fixture (not shown) is attached to upper plate 11. Platform 10 is attached to the automatic testing machine (not shown) by lower plate 12. Platform 10 includes alignment pins 13 attached to upper plate 11. Pins 13 fit into corresponding holes 31 in the lower plate 12, as shown in FIG. 3A. When platform 10 is placed into the loading/unloading position, upper plate 11 is moved, and each of pins 13 couples with their respective bushing 31. In the loading/unloading position or locked position, pins 13 tightly engage bushings 32, and provide a tight registration in X, Y, and Z directions. Registration in the X and Y or horizontal directions is provided by the placement of the pins. Registration in the Z or vertical direction is provided by the shoulders 32,33 on bushings 31 and pins 13. Alternatively, only pin 13 would have shoulder 33, which would act a stop when pin 13 is inserted into bushing 32, thus, bushing 32 would not need a shoulder. Note that pins 35 could be located on lower plate 12 and bushings 34 could be located on upper plate 11, as shown in FIG. 3B.

Platform 10 includes pneumatic positioners 14 which move upper plate 11 between an isolated testing position and a locked loading/unloading position. In one arrangement pneumatic positioners 14 lift upper plate 11 into the testing position, and disengage pins 13 from bushings 31. Upper plate 11 is then supported by isolation mechanism 15 and is isolated from lower plate 12 and the testing machine. Isolation mechanism could comprise air bearings, which are inflated to a setable pressure. Alternatively, isolation mechanism 15 could comprise a foam or rubber plate. The foam plate could be an open or closed cell foam. This could be located between upper plate 11 and positioners 14. Another isolation mechanism 15 could be air shocks or air bearings. Other isolation mechanisms could comprise hydraulic bearings, which are filled with hydraulic fluid to a setable pressure, or a mechanical spring and shock absorber arrangement. If electromagnetic interference is not a concern, then an electromagnetic system could be used. A permanent magnet could be installed on upper plate 11. An electromagnet would be located on lower plate 12. A like field created by the electromagnet would repel and lift upper plate 11. As the electromagnet is turned off, upper plate 11 would lower to the lock position. An opposite field created by the electromagnet would hold upper plate 11 in place. Note that all vibrational energy cannot be eliminated, as some will leak through the isolation mechanism being used, and thus what is meant by isolation is a reduction of the energy, not complete elimination of the energy.

Figure 2A:
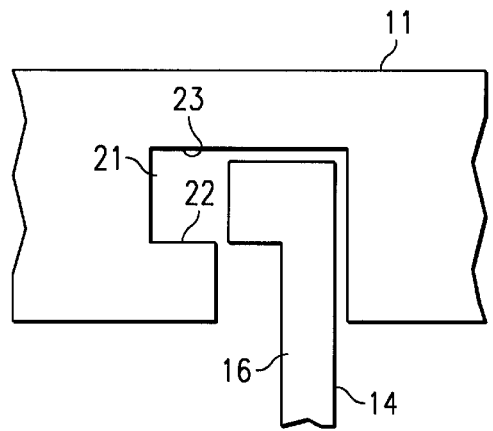
FIGS. 2A and 2B depict a latching mechanism used by the platform of FIG. 1 to secure the fixture during loading and unloading of the device under test.
Figure 2B:
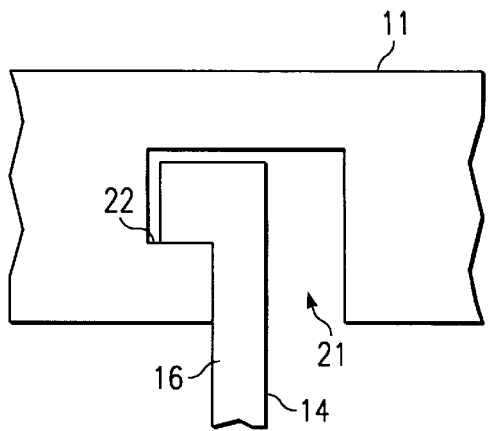

Pneumatic positioners 14 retract upper plate 11 into the locked position, and engage pins 13 into bushings 31, as shown in FIG. 3A. Pneumatic positioner 14 includes pneumatically actuated finger portion 16, shown in FIG. 2A, which contacts flange 22 of cavity 23, and pulls plate 11 down into the locking position, as shown in FIG. 2B. Finger portion 16 can also lift plate 11 into the testing position by contacting a surface 23 of cavity 21 in plate 11. Alternatively, a pneumatically actuated piston (not shown) in the positioner 14 can lift plate 11 into the testing position. Note that the fingers can latch onto a peripheral portion of upper plate 11 to retract plate 11, instead of cavity 21. Note that positioner 14 can be hydraulically actuated instead pneumatically actuated.

Isolation mechanism 15 will have to be compensated for during retraction of the plate. For example, if isolation mechanism 15 is a spring and shock absorber mechanism, then positioners 14 would compress the spring in retracting the plate into the locked position. If isolation mechanism 15 is a foam plate located on positioners 14, then the foam would be compressed while supporting plate 11, and uncompressed as positioners 14 retract after engaging the pins into the bushings. If isolation mechanism 15 is an air bearing, then the air bearing either would be deflated or compressed during retraction of the plate.

In an alternative arrangement, the pneumatic positioners 14 lift upper plate 11 into the locked position, and engage pins 35 to bushings 34, as shown in FIG. 3B. Upper plate 11 is then supported by positioner 14, during loading and unloading of the DUT from the fixture, which firmly holds upper plate 11 in the locked position. Pneumatic positioners 14 lower upper plate 11 into the testing position, and disengage pins 35 from bushings 34, as shown in FIG. 3B. Upper plate 11 is then supported by isolation mechanism 15. Positioner 14 would then move to a position where it is not in contact with upper plate 11, and thus upper plate 11 is isolated from the testing machine. Finger portions shown in FIGS. 2A and 2B could be used to retract plate 11, or the weight of plate 11 could be used to lower plate 11 as a piston (not shown) is retracted.

Movement of plate 11 between the locked and testing positions could be timed with powering up and down of DUT, and thus minimized impact on cycle time, and improve production time.

Although the present invention and its advantages have been described in detail, it should be understood that various changes, substitutions and alterations can be made herein without departing from the spirit and scope of the invention as defined by the appended claims.

What is claimed is:

1. An isolation platform for isolating a fixture from vibrations from an automatic testing machine, the platform comprising:

a first plate for fixedly attaching the platform to the machine;

a second plate which is movably connected to the first plate, and supports the fixture;

a positioning mechanism that is connected between the first and second plates, and moves the second plate between a locked position and a testing position; and a vibration isolation mechanism that isolates the second plate from the first plate and is operative in the testing position, thereby isolating the fixture from the machine;

wherein the second plate is rigidly attached to the first plate in the locked position.

2. The platform of claim 1, further comprising:

a plurality of pins; and a plurality of bushings;

wherein each pin engages a respective bushing when the platform is in the locked position, and rigidly attaches the first plate and the second plate.

3. The platform of claim 2, wherein: the plurality of pins are located on the first plate, and the plurality of bushings are located on the second plate.

4. The platform of claim 2, wherein: the plurality of pins are located on the second plate, and the plurality of bushings are located on the first plate.

5. The platform of claim 2, wherein:

each pin includes a shoulder which abuts a portion of the respective bushing, and prevents movement of the pin in the vertical direction.

6. The platform of claim 1, wherein the positioning mechanism comprises:

at least one pneumatically operated piston which lifts the second plate.

7. The platform of claim 1, wherein the positioning mechanism comprises:

at least one pneumatically operated finger which lifts the second plate by contacting the second plate, and retracts the second plate by engaging a portion of the second plate.

8. The platform of claim 7, wherein:

the portion of the second plate is a flange.

9. The platform of claim 7, wherein:

the portion of the second plate is a peripheral edge.

10. The platform of claim 1, wherein:

the positioning mechanism disengages from the second plate after moving the second plate to the testing position, such that the second plate is vibrationally isolated from the positioning mechanism.

11. The platform of claim 1, wherein the vibration isolation mechanism comprises:

an air bearing which is inflated to a predetermined pressure.

12. The platform of claim 1, wherein the vibration isolation mechanism comprises:

a cell foam plate which is connected to the second plate.

13. The platform of claim 12, wherein:

the cell foam plate is connected to the first plate.

14. The platform of claim 12, wherein:

the cell foam plate is connected to the positioning mechanism.

15. The platform of claim 1, wherein:

the machine tests a device supported by the fixture in the testing position.

16. The platform of claim 1, wherein:

the machine loads a device into the fixture in the locked position.

17. The platform of claim 1, wherein:

the machine unloads a device from the fixture in the locked position.

18. An automatic testing machine which includes an isolation platform for isolating a fixture from vibrations from the automatic testing machine, the platform comprising:

a first plate which is fixedly attached to the machine;

a second plate which is movably connected to the first plate, and supports the fixture;

a positioning mechanism that is connected between the first and second plates, and moves the second plate between a locked position and a testing position;

a vibration isolation mechanism that isolates the second plate from the first plate and is operative in the testing position, thereby isolating the fixture from the machine;

a plurality of bushings; and a plurality of pins, each pin engages a respective bushing when the platform is in the locked position, and rigidly attaches the first plate and the second plate;

wherein the machine tests a device supported by the fixture in the testing position, and the machine loads the device into the fixture in the locked position, and the machine unloads the device from the fixture in the locked position.

19. The machine of claim 18, wherein:

the plurality of pins are located on the first plate, and the plurality of bushings are located on the second plate.

20. The machine of claim 18, wherein:

the plurality of pins are located on the second plate, and the plurality of bushings are located on the first plate.

21. The machine of claim 18, wherein:

each pin includes a shoulder which abuts a portion of the respective bushing, and prevents movement of the pin in the vertical direction.

22. The machine of claim 18, wherein the positioning mechanism comprises:

at least one pneumatically operated piston which lifts the second plate.

23. The machine of claim 18, wherein the positioning mechanism comprises:

at least one pneumatically operated finger which lifts the second plate by contacting the second plate, and retracts the second plate by engaging a portion of the second plate.

24. The machine of claim 23, wherein:

the portion of the second plate is a flange.

25. The machine of claim 23, wherein:

the portion of the second plate is a peripheral edge.

26. The machine of claim 18, wherein:

the positioning mechanism disengages from the second plate after moving the second plate to the testing position, such that the second plate is vibrationally isolated from the positioning mechanism.

27. The machine of claim 18, wherein the vibration isolation mechanism comprises:

an air bearing which is inflated to a predetermined pressure.

28. The machine of claim 18, wherein the vibration isolation mechanism comprises:

a cell foam plate which is connected to the second plate.

29. The machine of claim 28, wherein:

the cell foam plate is connected to the first plate.

30. The machine of claim 28, wherein:

the cell foam plate is connected to the positioning mechanism.

31. An isolation platform for isolating a fixture from vibrations from an automatic testing machine, the platform comprising:

first means for fixedly attaching the platform to the machine;

second means for supporting the fixture;

third means for moving the second means between a locked position and a testing position; and fourth means, operative in the testing position, for vibrationally isolating the second means from the first means and thereby isolating the fixture from the machine; and fifth means, operative in the locked position, for rigidly attaching the second means to the first means.

32. The platform of claim 31, wherein the fifth means comprises:

a plurality of pins; and a plurality of bushings;

wherein each pin engages a respective bushing when the platform is in the locked position, and rigidly attaches the first means and the second means.

33. The platform of claim 32, wherein:

the plurality of pins are located on the first means, and the plurality of bushings are located on the second means.

34. The platform of claim 32, wherein:

the plurality of pins are located on the second means, and the plurality of bushings are located on the first means.

35. The platform of claim 32, wherein:

each pin includes a shoulder which abuts a portion of the respective bushing, and prevents movement of the pin in the vertical direction.

36. The platform of claim 31, wherein the third means comprises:

at least one pneumatically operated piston which lifts the second means.

37. The platform of claim 31, wherein the third means comprises:

at least one pneumatically operated finger which lifts the second means by contacting the second means, and retracts the second means by engaging a portion of the second means.

38. The platform of claim 37, wherein:

the portion of the second means is a flange.

39. The platform of claim 37, wherein:

the portion of the second means is a peripheral edge.

40. The platform of claim 31, wherein:

the third means disengages from the second means after moving the second means to the testing position, such that the second means is vibrationally isolated from the third means.

41. The platform of claim 31, wherein the fourth means comprises:

an air bearing which is inflated to a predetermined pressure.

42. The platform of claim 31, wherein the fourth means comprises:

a cell foam plate which is connected to the second means.

43. The platform of claim 42, wherein:

the cell foam plate is connected to the first means.

44. The platform of claim 42, wherein:

the cell foam plate is connected to the third means.

45. The platform of claim 31, wherein:

the machine tests a device supported by the fixture in the testing position.

46. The platform of claim 31, wherein:

the machine loads a device into the fixture in the locked position.

47. The platform of claim 31, wherein:

the machine unloads a device from the fixture in the locked position.

48. A method for isolating a fixture from vibrations from an automatic testing machine, the method comprising the steps of:

fixedly attaching the platform to the machine via a first plate;

movably supporting the fixture via a second plate;

moving the second plate between a locked position and a testing position; and vibrationally isolating the second plate from the first plate and thereby isolating the fixture from the machine in the testing position; and rigidly attaching the second plate to the first plate in the locked position.

49. The method of claim 48, wherein the step of rigidly attaching comprises the steps of:

providing a plurality of pins, each with a respective bushing; and inserting each pin into the respective bushing when the platform is moved into the locked position.

50. The method of claim 48, wherein the step of moving comprises the step of:

pneumatically actuating a piston to lift the second plate.

51. The method of claim 48, wherein the step of moving comprises the step of:

pneumatically operating a finger to lift the second plate by contacting the second plate, and retracting the second plate by engaging a portion of the second plate.

52. The method of claim 51, wherein:

the portion of the second plate is a flange.

53. The method of claim 51, wherein:

the portion of the second plate is a peripheral edge.

54. The method of claim 48, wherein:

the step of vibrationally isolating is performed by using an air bearing which is inflated to a predetermined pressure.

55. The method of claim 48, wherein:

the step of vibrationally isolating is performed by using a cell foam plate which is connected to the second plate.

* * * * *